United States Patent
Krammer

(10) Patent No.: US 11,309,697 B2
(45) Date of Patent: Apr. 19, 2022

(54) APPARATUS FOR TRIPPING A CIRCUIT BREAKER FOR VEHICLES

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 402 days.

(21) Appl. No.: 15/177,988

(22) Filed: Jun. 9, 2016

(65) Prior Publication Data

US 2016/0294177 A1 Oct. 6, 2016

Related U.S. Application Data

(63) Continuation of application No. PCT/EP2014/977188, filed on Dec. 10, 2014.

(30) Foreign Application Priority Data

Dec. 12, 2013 (DE) ...................... 10 2013 225 732.5

(51) Int. Cl.
*H02H 3/08* (2006.01)
*H02H 9/02* (2006.01)
(Continued)

(52) U.S. Cl.
CPC ........ *H02H 1/0007* (2013.01); *H01H 47/007* (2013.01); *H01H 71/125* (2013.01); *H02H 3/087* (2013.01)

(58) Field of Classification Search
CPC ........ H02H 3/00; H02H 3/087; H02H 1/0007; H02H 3/08
(Continued)

(56) References Cited

U.S. PATENT DOCUMENTS 3,215,866 A * 11/1965 Seguin ................ H01H 53/015
361/5
3,307,125 A * 2/1967 Schwarzkopf ......... H02K 33/10
335/95
(Continued)

FOREIGN PATENT DOCUMENTS

CH 161679 A 5/1933
CN 101601112 A 12/2009
(Continued)

OTHER PUBLICATIONS

Chinese Office Action issued in counterpart Chinese Application No. 201480067509.6 dated Apr. 5, 2017 with English translation (11 pages).

(Continued)

*Primary Examiner* — Jared Fureman
*Assistant Examiner* — Lucy M Thomas
(74) *Attorney, Agent, or Firm* — Crowell & Moring LLP

(57) ABSTRACT

An apparatus is provided for protecting high-voltage electrical connections, in particular in vehicles. A fuse for interrupting a line includes a conduction coil, which is designed to have a conduction current on the line flowing through the conduction coil and to thereby generate a magnetic field. Furthermore, the includes a control coil, which is magnetically coupled to the conduction coil, and a circuit breaker, which is designed to interrupt the line depending on a field intensity of the magnetic field. In addition, the fuse includes a control unit, which is designed to determine a control current through the control coil in order to vary the field intensity of the magnetic field, and thus to cause or suppress an interruption of the line by way of the circuit breaker.

11 Claims, 5 Drawing Sheets

(51) Int. Cl.
  *H02H 1/00* (2006.01)
  *H02H 3/087* (2006.01)
  *H01H 47/00* (2006.01)
  *H01H 71/12* (2006.01)

(58) Field of Classification Search
  USPC .......................................................... 361/93.1
  See application file for complete search history.

(56) References Cited

U.S. PATENT DOCUMENTS

| | | | | |
|---|---|---|---|---|
| 3,621,334 | A | * | 11/1971 | Burns .................. H02H 1/0007 |
| | | | | 327/419 |
| 4,152,637 | A | | 5/1979 | Oberbeck et al. |
| RE30,304 | E | * | 6/1980 | Eckart ................... H02H 3/347 |
| | | | | 361/44 |
| 4,249,068 | A | | 2/1981 | Mangan et al. |
| 4,742,422 | A | | 5/1988 | Tigges |
| 7,800,874 | B2 | * | 9/2010 | DiSalvo ................ H02H 3/335 |
| | | | | 361/42 |
| 2001/0026428 | A1 | | 10/2001 | Polese et al. |
| 2006/0119342 | A1 | | 6/2006 | Teulings et al. |
| 2009/0198459 | A1 | * | 8/2009 | Bilac .................... H02H 1/0015 |
| | | | | 702/58 |
| 2010/0002350 | A1 | | 1/2010 | Koppmann et al. |
| 2014/0191772 | A1 | | 7/2014 | Hetzler |
| 2015/0084721 | A1 | | 3/2015 | Ziegler et al. |
| 2017/0213681 | A1 | * | 7/2017 | Gubel .................... B60L 58/10 |

FOREIGN PATENT DOCUMENTS

| | | |
|---|---|---|
| DE | 196 42 472 A1 | 4/1998 |
| DE | 199 63 504 C1 | 10/2001 |
| DE | 10 2007 032 894 A1 | 1/2009 |
| DE | 10 2011 113 002 A1 | 3/2013 |
| DE | 10 2012 102 431 A1 | 9/2013 |
| EP | 0 220 408 A1 | 5/1987 |
| EP | 0 762 590 A1 | 3/1997 |
| FR | 2 846 749 A1 | 5/2004 |

OTHER PUBLICATIONS

Internationa Search Report (PCT/ISA/210) issued in PCT Application No. PCT/EP2014/077188 dated Mar. 16, 2015 with English translation (five pages).

German-language Written Opinion (PCT/ISA/237) issued in PCT Application No. PCT/EP2014/077188 dated Mar. 16, 2015 (seven pages).

German Search Repost issued in counterpart German Application No. 10 2013 225 732.5 dated Mar. 19, 2014 with partial English translation (10 pages).

\* cited by examiner

APPARATUS FOR TRIPPING A CIRCUIT BREAKER FOR VEHICLES

CROSS REFERENCE TO RELATED APPLICATIONS

This application is a continuation of PCT International Application No. PCT/EP2014/077188, filed Dec. 10, 2014, which claims priority under 35 U.S.C. § 119 from German Patent Application No. 10 2013 225 732.5, filed Dec. 12, 2013, the entire disclosures of which are herein expressly incorporated by reference.

BACKGROUND AND SUMMARY OF THE INVENTION

The invention relates to an apparatus for protecting high-voltage electrical connections, particularly in vehicles.

Hybrid and electric vehicles typically employ fuse links in high-voltage on-board power supply systems (HV onboard power supply systems). The fuse links are used to protect individual cable runs (having different currents and cable cross sections) in the onboard power supply system. The individual cable runs are used to transport electric power from a battery of the vehicle to various loads (e.g. air conditioning systems, etc.) in the vehicle and/or to transport electric power from a source (e.g. a charger, a generator, etc.) in the vehicle to the battery of the vehicle. The battery of the vehicle is typically a high-voltage battery, for example having a voltage of several 100 V.

For the different cable runs, it would be possible to use a separate "fuse distributor" having electrical fuses (e.g. fuse links) for the different cable runs in the vehicle. However, such a fuse distributor would result in increased wiring complexity (and hence in increased costs, increased weight and increased space requirement) in the vehicle. For this reason, existing components of the vehicle (e.g. the power electronics, the charger, etc.) are fitted with additional electrical connections (for additional loads and sources in the vehicle) that are provided with fuses for the electrical connections in the existing components.

Fuse links that are situated within the existing components typically cannot be replaced in service mode, however, since appropriate openings on the existing components for fuse replacement would be very complex on account of numerous requirements, such as e.g. HV protection, tightness, adequate accessibility, etc. Therefore, when a fuse is tripped, typically the entire existing component is replaced, even though the component is otherwise operational, since the reason for the fuse link being tripped typically lies at a different location in the onboard power supply system (e.g. a faulty cable).

The present document describes an apparatus and a method for making safe a cable run in an HV onboard power supply system of a vehicle. The apparatus described and the method described ensure reliable tripping of a fuse in the cable run. Furthermore, resetting of the fuse is made possible, meaning that a vehicle component that includes the fuse can be reused.

According to one aspect, a fuse for interrupting a line is described. The line may be a line in an HV onboard power supply system of a vehicle (e.g. an automobile or a truck or a motor cycle). In particular, the vehicle may be a vehicle having an electric motor for driving the vehicle. The fuse can be used to protect a component connected via the line (e.g. a load in the vehicle) from an excessive current.

The fuse comprises a line coil that is set up to carry a line current on the line and thereby to generate a magnetic field. In other words, the line current on the line can take the line coil as a basis for generating a magnetic field. Furthermore, the fuse includes a control coil that is magnetically coupled to the line coil. For this purpose, the line coil and the control coil may be connected to one another by a magnetically conductive core. The control coil can carry a control current and thereby influence the magnetic field (particularly a field strength of the magnetic field). In this case, the line coil may have a smaller number of turns than the control coil. This means that even with a relatively small control current, it is possible to generate a magnetic field that has the same order of magnitude as the magnetic field generated by the line current.

The fuse additionally includes a circuit breaker that is set up to interrupt the line on the basis of a field strength of the magnetic field. Typically, the line is interrupted (e.g. as a result of the circuit breaker opening) when the field strength of the magnetic field exceeds a predefined field strength threshold value. In the absence of a control current, the field strength threshold value typically corresponds to a tripping current threshold value of the line current. Hence, when there is a line current that exceeds the tripping current threshold value, the line is interrupted by the circuit breaker.

Furthermore, the fuse comprises a control unit that is set up to determine (and if need be also to generate) a control current through the control coil in order to alter the field strength of the magnetic field, and hence to cause or prevent interruption of the line by the circuit breaker. The control unit can be supplied with electric power by an LV system in the vehicle (e.g. a 12V system in the vehicle). The line coil and the control coil provide DC isolation between HV system and LV system. The control unit may be an analog or digital electronic circuit with or without software.

The use of a control unit that influences the tripping magnetic field via the control coil allows reliable tripping of the fuse to be ensured. Furthermore, the use of a control unit allows the implementation of precise and/or complex tripping characteristic curves.

The fuse can include a device for measuring the field strength of the magnetic field (e.g. a Hall sensor). The control unit may be set up to determine the control current on the basis of the measured field strength of the magnetic field. In particular, the control unit may be set up to determine the control current such that the (absolute) field strength is lower than or the same as a predefined field strength threshold value (e.g. zero). In order words, the control current can be determined such that the (absolute) field strength of the magnetic field is regulated to a particular predefined field strength value (e.g. the value zero).

As explained in this document, the control current, if need be in connection with the field strength of the magnetic field, is an indicator of the line current. Hence, the control current can be used to check whether the line current has exceeded a predefined tripping current threshold value, and therefore the fuse should be tripped in order to interrupt the line.

The control unit may be set up to compare a signal derived from the control current (e.g. a boosted control current) with a tripping current threshold value. As explained above, the derived signal may he an indicator of the line current. Furthermore, the control unit may be set up to determine the control current such that the magnetic field generated by the line coil is attenuated if the derived signal is smaller than the tripping current threshold value. This allows tripping of the fuse to be prevented. In particular, unintentional tripping of the fuse (e.g. as a result of tremors) can be prevented.

Alternatively or additionally, the control unit may be set up to determine the control current such that the magnetic field generated by the line coil is boosted if the derived signal is larger than the tripping current threshold value. Boosting of the magnetic field allows tripping of the fuse to be assisted, and therefore reliable tripping of the fuse to be ensured.

The control unit may be set up to establish whether the signal derived from the control current is at or above the tripping current threshold value for at least one predefined period. Furthermore, the control unit may be set up to determine the control current such that the magnetic field generated by the line coil is boosted (only) if the derived signal is at or above the tripping current threshold value for at least the predefined period. If the condition is not present, then the magnetic field generated by the line coil can be attenuated. By taking account of the predefined period, it is possible to take account of the inertia of components in relation to overcurrents. In particular, tripping on account of brief current spikes can be avoided.

The fuse can include a resetting coil that is set up to close the circuit breaker, by building up a magnetic field, in order to suspend interruption of the line. This can allow reuse of the fuse after tripping.

The fuse may be designed such that the magnetic field generated (exclusively) by the line current causes interruption of the line by the circuit breaker if the line current reaches or exceeds a default threshold value. The default threshold value may be lower than or the same as the aforementioned tripping current threshold value. It is therefore possible to ensure that the fuse is tripped when the default threshold value is reached (even if the control unit and the control current fail). The default threshold value is typically lower than a predefined feasible operating current for a component that is supplied with electric current via the line, or lower than a maximum operating current for the line to the component. The feasible operating current may be the operating current for which the component has been designed. The feasible operating current may be time dependent. The design of the fuse in relation to a default threshold value ensures that there is no damage to the component even if the control unit fails.

The component can have a typical operating current that is smaller than the feasible operating current of the component. The typical operating component can correspond to an operating current at which the component is typically operated. The typical operating current may be time dependent. The default threshold value may be lower than the typical operating current. This results in failure of the control unit resulting directly in tripping of the fuse (if the component is operated at or above the typical operating current). On the other hand, the control unit may be set up to determine the control current such that the circuit breaker interrupts the line at a line current that is higher than the typical operating current and is smaller than the feasible operating current. In other words, the tripping current threshold value can be chosen such that it is higher than the typical operating current and smaller than the feasible operating current. Hence, the control unit provides the desired protection from overcurrent (i.e. for currents beyond the feasible operating current), and at the same time ensures reliable protection if the control unit fails.

According to a further aspect, an apparatus for identifying a fault current through a load is described. The apparatus comprises a first fuse, described in this document, that is situated on a line that leads to the load. The first fuse is set up to determine a first control current in the manner described in this document. Furthermore, the apparatus comprises a second fuse, described in this document, on a line that leads away from the load. The second fuse is set up to determine a second control current in the manner described in this document. Furthermore, the apparatus includes a comparison unit that is set up to compare the first and second control currents and to take the comparison as a basis for identifying a fault current on the load. As described in this document, the first and second control currents are indicators for the line currents on the line to the load and on the line from the load, respectively. Comparison of the control currents therefore allows a fault current to be detected in the load (to ground). The detection of a fault current can result in tripping of the first and/or second fuse.

According to a further aspect, a vehicle is described that includes the fuse described in this document.

According to a further aspect, a method is described. By way of example, the method can be carried out by a control unit and/or fuse described in this document. The method described includes features that correspond to the features of the fuse described in this document.

According to a further aspect, a software (SW) program is described. The SW program can be set up to be executed on a processor and to thereby carry out the method described in this document.

According to a further aspect, a storage medium is described. The storage medium can have an SW program stored thereon that is set up to be executed on a processor and to thereby carry out the method described in this document.

It should be noted that the methods, apparatuses and systems described in this document can be used either alone or in combination with other methods, apparatuses and systems described in this document. Furthermore, any aspects of the methods, apparatus and systems described in this document can be combined with one another in many diverse ways.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4b is an exemplary circuit diagram of a fuse for producing the current/time graph shown in FIG. 4a;

DETAILED DESCRIPTION OF THE DRAWINGS

Figure 1A:
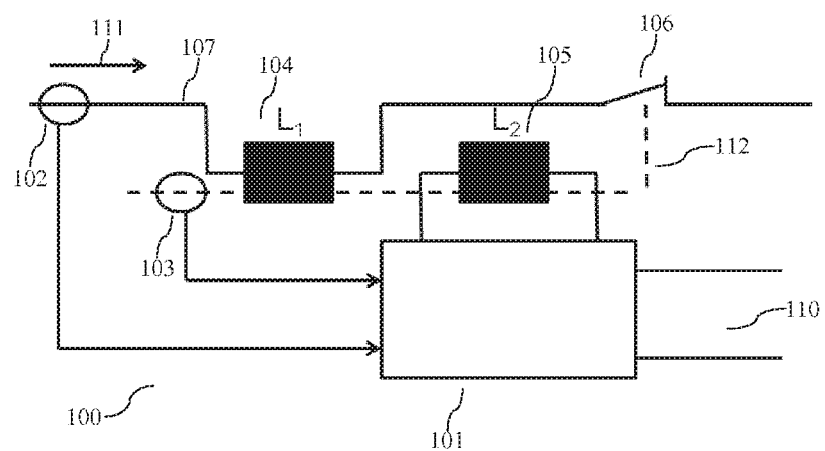
FIG. 1a is a schematic block diagram of an exemplary fuse.

As explained at the outset, the present document describes an apparatus and a method for making safe a cable run in an HV onboard power supply system of a vehicle. The apparatus described and the method described ensure reliable tripping of a fuse in the cable run. Furthermore, resetting and hence reuse of the fuse are made possible.

As an alternative to the use of fuse links in vehicles, the use of electromechanical automatic fuses could be considered. The electromechanical automatic fuses customary in households have the advantage that they can be reset and can carry out their function again after the fuse has tripped and after the cause of the fuse being tripped has been removed. Electromechanical automatic fuses typically cannot be used in vehicles, however, since they can be tripped unintentionally as a result of movements in the vehicle (vibrations, accelerations, etc.).

As regards the protective function of a line fuse, the following different instances of application can typically be considered:

1. Short circuit: in the case of a short circuit, very high currents normally arise, which should be disconnected very quickly. Possible tripping mechanisms for a fuse that react to a short circuit are the fuse being blown or a magnetic switch being tripped.

2. Overload: in the case of overload, (possibly slightly) increased currents arise above a rated current for the fuse. The increased currents can last for relatively long periods. Owing to the thermal inertia of the systems (lines, connectors, etc), disconnection is typically much less time-critical than in the case of a short circuit. Possible tripping mechanisms for a fuse that react to an overload are a wire being melted or a bimetallic contact being heated.

The fuse in a line should, as far as possible, be able to trip even without an additional electric power supply of its own. In particular, this should be the case even with a short circuit, when the voltage between the phases in the onboard power supply system is zero. The tripping should therefore be effected exclusively via the flow of current in the line that is to be made safe. In other words, the power for tripping the fuse should, as far as possible, be obtained from the overload current and the voltage drop across the fuse itself.

As already explained at the outset, the use of fuse links in the vehicle can result in the unnecessary replacement of relatively expensive, difficult-to-replace components of the vehicle. This increases repair costs for the vehicle.

Owing to the very different operating temperatures of the various components in the vehicle (typically from −25° C. to 125"C.), the operating temperatures of the fuses used in the components also have a correspondingly broad scatter. This results in the actual tripping currents for the fuses in the different components varying to a relatively great extent. This in turn results in the lines that are to be made safe (particularly the line cross section, the connectors used, etc.) needing to be designed in accordance with the tripping current that is actually present for the fuse at operating temperature. This results in increased complexity for the dimensioning of the individual lines of the onboard power supply system.

As already explained at the outset, electromagnetic circuit breakers have the disadvantage that they are sensitive toward tremors that are typical in a vehicle. This is particularly because close to the tripping threshold of the fuse (i.e. at the tripping operating current), the magnetic force already has a relatively great effect on the circuit breaker at the fuse. If a corresponding mechanical acceleration (-tremor) is added to the magnetic force, the mechanical and magnetic forces can act in concert and result in the fuse tripping, even though the current is still below the tripping threshold. Therefore, electromagnetic circuit breakers known from households cannot be used reliably in vehicles.

FIG. 1a shows a block diagram of an exemplary fuse or fuse circuit 100. The fuse 100 includes a device 102 for measuring the current 111 through the line 107. The line 107 is typically part of the HV onboard power supply system of a vehicle. By way of example, the device 102 for measuring the current 111, also referred to as line current ($I_S$), may be a measuring resistor, the voltage drop across the measuring resistor being an indicator of the line current 111. Alternatively or additionally, the fuse 100 can include a device 103 for measuring the strength of a magnetic field Φ 112 through the coils $L_1$ 104 and $L_2$ 105 of the fuse 100. By way of example, the device 103 for the magnetic field 112 may be a Hall sensor.

Furthermore, the fuse 106 includes a switch 106 (also referred to as circuit breaker) that is set up to interrupt the line current 111 on the line 107. The switch 106 is set up to be opened by the magnetic field 112. In particular, the switch 106 opens when the magnetic field 112 exceeds a predefined tripping threshold value. The magnetic field 112 can be generated by the first coil 104 and/or by the second coil 105 of the fuse 100. To this end, the first coil 104 (also referred to as line coil 104), the second coil 105 (also referred to as control coil 105) and a trip for the switch 106 may be magnetically coupled to one another. For the magnetic coupling, it is possible to use a shared core having relatively high permeability or magnetic conductivity. Typically, the control coil 105 has a higher number of turns than the line coil 104 in order to have a significant influence on the field strength of the magnetic field 112 even with control currents through the control coil 105 that are low in comparison with the line current 111.

The fuse 100 additionally includes a control unit 101. The control unit 101 may be connected to a low voltage (LV) system 110 of the vehicle. In other words, the control unit 101 can be supplied with electric power by an LV system 110 (e.g. a 12 V system) of the vehicle. The control unit 101 may be set up to receive an indicator for the line current 111 from the device 102 for current measurement and/or an indicator for the magnetic field 112 from the device 103 for magnetic field measurement. Furthermore, the control unit 101 may be set up to control or determine the control current through the control coil 105 in order to manipulate (particularly to boost or attenuate) the magnetic field 112 by means of the control current.

Figure 1B:
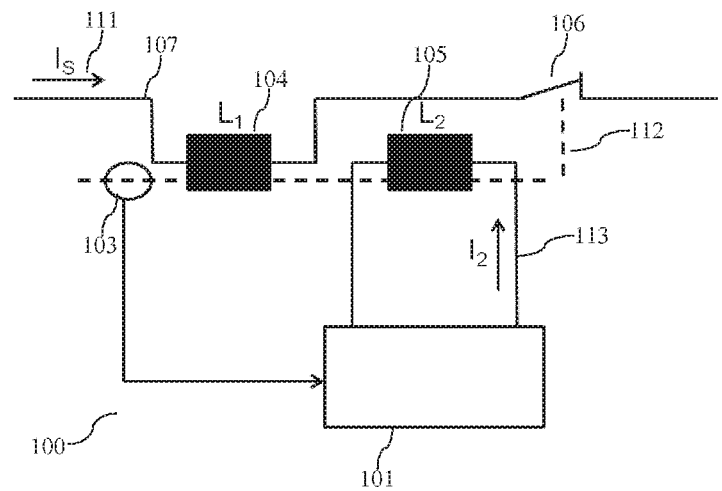
FIG. 1b is a further schematic block diagram of an exemplary fuse.

FIG. 1b shows a fuse 100 that includes a device 103 for measuring the magnetic field 112 (but no device 102 for measuring the line current 111). The control coil $L_2$ 105 can be actuated (by the control unit 101) such that the magnetic flux Φ112 disappears and hence no magnetic force effect on the circuit breaker 106 is produced. In other words, the control unit 101 may be set up to set the control current $I_2$ 113 through the control coil $L_2$ 105 such that the magnetic field 112 through the coils 104, 105 and at the switch 106 is zero (or at least smaller than a predefined safety threshold value).

The magnetic field in the coils 104, 105 is dependent on the turns $n_1$ and $n_2$ of the first and second coils 104, 105. In particular, $$\Phi_1 = I_s \frac{n_1}{l_1}$$

applies for the field strength $\Phi_1$ of the magnetic field generated by the line coil 104, wherein $n_1$ is the number of turns in the line coil 104 and where $l_1$ is the length of the line coil or the length of the air gap in the magnetic circuit 104. Similarly, $$\Phi_2 = I_2 \frac{n_2}{l_2}$$

applies for the field strength $\Phi_2$ of the magnetic field generated by the control coil 105, wherein $n_2$ is the number of turns in the control coil 105 and where $l_2$ is the length of the control coil or the length of the air gap in the magnetic circuit 105. The field strength of the magnetic field generated by both coils 104, 105 is obtained as $\Phi = \Phi_1 + \Phi_2$.

As already explained above, the control unit 101 is set up to ascertain the field strength $\Phi$ using the device 103 for measuring the magnetic field 112. The control unit 101 is additionally set up to alter the control current $I_2$ such that the field strength $\Phi$ is lower than or the same as the predefined safety threshold value $\Phi_s$, i.e. $\Phi \leq \Phi_s$. In particular, the control unit 101 may be set up to alter the control current $I_2$ such that the field strength is $\Phi = 0$. In this case, the following is obtained:

$$\Phi = \Phi_1 + \Phi_2 = I_s \frac{n_1}{l_1} + I_2 \frac{n_2}{l_2} = 0.$$

Hence, the control current $I_2$ that is set in order to regulate the field strength $\Phi$ to a certain value (e.g. to the value 0) is an indicator for the line current $I_s$, e.g.

$$I_2 = -I_s \frac{n_1}{l_1} \frac{l_2}{n_2}.$$

The ratio $$\frac{n_1}{l_1} \frac{l_2}{n_2}$$

can be chosen to be small as a result of suitable choice of the number of turns and/or the length of the coils, so that the control current $I_2$ is small in comparison with the line current $I_s$, and hence also the electric power required for controlling the fuse 100 is low. In particular, $n_1 \ll n_2$ can be chosen (e.g. for identical coil lengths or identical lengths of the air gap in the magnetic circuit).

Figure 2:
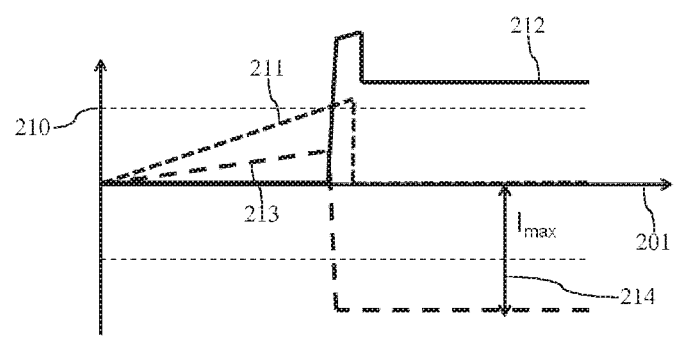
FIG. 2 is a graphical diagram of exemplary currents in a fuse.

FIG. 2 shows an exemplary actuation of the control coil 105 and an exemplary tripping of the circuit breaker 106 on the basis of the line current 111. In particular, FIG. 2 shows the line current 111, 211, which increases with time 201 and finally exceeds the tripping current threshold value 210 $I_{threshold}$. As the line current 211 rises, the field strength 212 of the magnetic field 112 would also rise. However, the control unit 101 is set up to determine the control current 213 through the control coil 105 such that the field strength 212 (if the line current 211 does not reach or does not exceed the tripping current threshold value 210, i.e. for $I_s < I_{theshold}$ or $I_s \leq I_{threshold}$) is zero (or at a defined value). The result is therefore a control current 113, 213 rising in similar fashion to the line current 211, which control current attenuates the magnetic field 112 generated by the line current 211 (to the defined field strength value). The control current 213 is therefore also referred to as a compensating current in this document.

As explained above, the control current 113, 213 is typically proportional to the line current 111, 211 on account of the regulation or control by the control unit 101, Hence, the control unit 101 can ascertain the corresponding line current 111, 211 from the control current 113, 213 (e.g. using an amplifier). In particular, the control unit 101 can check whether the line current 211 reaches or exceeds the tripping current threshold value 210, i.e. whether $I_s \leq I_{threshold}$. The control unit 101 may additionally be set up to terminate the compensation for the magnetic field from the line coil 104 by the control coil 105 if it is ascertained that the tripping current threshold value 210 is reached or exceeded. As a result of the interruption to the magnetic field compensation, the field strength 212 of the magnetic field 112 at the circuit breaker 106 corresponds to the field strength $$\Phi_1 = I_s \frac{n_1}{l_1}$$

that causes the circuit breaker 106 to open or trip at $I_s \geq I_{threshold}$.

In order to ensure reliable tripping of the circuit breaker 106, the control unit 101 may be set up to produce a control current 113, 213, which boosts the field strength $\Phi_1$, if it is ascertained that the line current 113, 213 has reached or exceeded the tripping current threshold value 210. This is shown in FIG. 2. In the case shown in FIG. 2, the control unit 101 produces an inverted control current 213 at a boost current $I_{max}$ 214. If the control current $I_2$ exceeds a threshold that corresponds to the tripping current threshold value 210, polarity reversal (and possibly boosting) of $I_2$ initiates tripping of the circuit breaker. The reversal of the control current 213 no longer compensates for the field strength $\Phi_1$ of the magnetic field from the line coil 104 but rather boosts it, which leads to a total field strength $\Phi$212 that is markedly above the tripping threshold value for the circuit breaker 106. As a result, it is possible to ensure that even when there are mechanical forces present in the vehicle that oppose tripping of the switch 106, reliable tripping of the switch 106 is ensured.

It is pointed out that the fuse 100 can be used bidirectionally, i.e. for positive and/or for negative line currents 111. The reversal of the line current 111 leads to reversal of the magnetic field 112, which in turn leads to reversal of the control current 113.

It should additionally be noted that the tripping accuracy of the fuse 100 is only dependent on the accuracy of the determination of the total field strength $\Phi$ 212 and the setting of the control current $I_2$. Hence, the fuse 100 can be tripped with a very high level of accuracy. In this case, the tripping is independent of the temperature of the fuse 100.

As already explained above, the circuit breaker 106 should remain in a stable condition in both positions (i.e. open and closed). In particular, the circuit breaker 106 should withstand the tremors that occur in a vehicle in these positions (without the action of an electromagnetic force). This can be achieved by suitable mechanical solutions (e.g. by mechanical springs).

The fuse 100, i.e. particularly the control unit 101, may be set up to permit, for a particularly predefined period (particularly in the short term), a line current 111 that goes beyond the tripping current threshold value 210 $I_{threshold}$. In other words, exceeding of the threshold value can he tolerated for a limited time, and a higher threshold value can be permitted on a temporary basis. In particular, the control unit 101 may be set up to increase the tripping current threshold value 210 $I_{threshold}$ for a particular period, and hence temporarily also to compensate for the magnetic field for excessive line currents 111 by means of a suitable control current 113. Hence, the behavior of the fuse 100 can be matched to systems with high peak currents and low average currents.

The fuse 100 ensures reliable tripping of the circuit breaker 106 even in the event of a fault in the control unit 101, e.g. in the event of a power failure, and therefore provides what is known as a "fail save" state. Failure of the control unit 101 results in an interruption of the magnetic field compensation. Even in such a case, a line current 111 going beyond the tripping current threshold value 210 results in the circuit breaker 106 tripping. However, the lack of magnetic field compensation can lead to premature tripping (e.g. on account of tremors in the vehicle).

In the fuse 100, the tripping of the circuit breaker 106 is defined by means of the control current $I_2$ 113 and by means of the appropriate tripping threshold. Hence, appropriate circuit dimensioning (components fitted, parameter calibration, etc.) for an analog control unit 101 and/or programming for a digital control unit 101 allow the tripping characteristics to be matched to the application of the fuse 100.

As can be gleaned from FIGS. 1a and 1b, the fuse 100 has no electrical connection between the path 107 to be made safe (in the HV onboard power supply system) and the control electronics 101 and the coil $L_2$ 105 (in the LV onboard power supply system). Hence, there is DC isolation between HV line and control.

Figure 3:
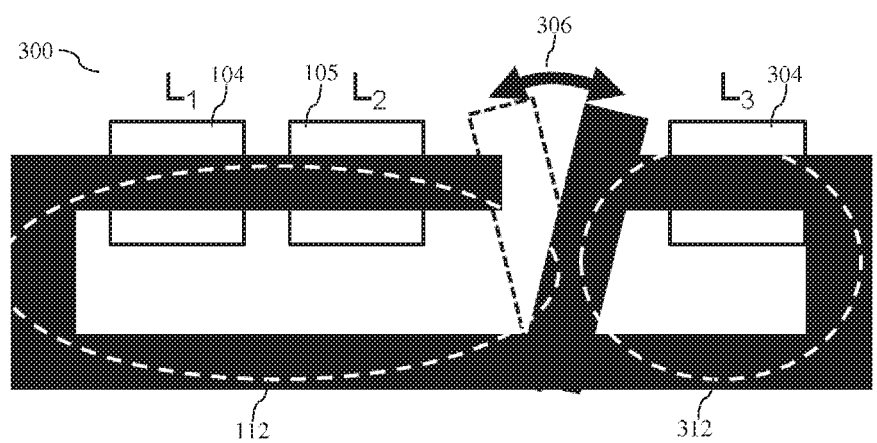
FIG. 3 is a schematic a block diagram of an exemplary resetting mechanism.

FIG. 3 shows selected portions of an exemplary fuse 300 that can be reset after tripping. FIG. 3 particularly shows a first magnetic circuit with the first magnetic field 112, which is generated by the line coil 104 and by the control coil 105. Furthermore, FIG. 3 shows a second magnetic circuit with a second magnetic field 312, which is generated by a resetting coil $L_3$ 304. Furthermore, FIG. 3 shows a moving component 306 that is magnetically coupled to each of the first and second magnetic fields 112, 312 and that is set up to open (in the position in a dashed representation) or to close (in the position in a solid representation) the circuit breaker 106. The moving component 306 is typically bistable for the two positions shown in FIG. 3.

The control unit 101 may be set up to actuate the resetting coil 304 too. For this purpose, a resetting current can be produced via the resetting coil 304, and this can produce a magnetic field 312 that moves the moving component 306 into the position that closes the circuit breaker 106 (i.e. into the position in the solid representation FIG. 3). On the other hand, the method presented above can use the first magnetic field 112 to move the moving component 306 into the position that opens the circuit breaker 106 (i.e. into the position in a dashed representation in FIG. 3).

Hence, the coil $L_3$ 304 can be used to reset the fuse 300 again after tripping. This can be done in different ways. The connections of the resetting coil $L_3$ 304 can be routed out of the component in which the fuse 300 is installed to dedicated connector pins. It is thus possible for the coil 304 to be actuated by means of a special adaptor and for the circuit breaker 106 to be reset. Thus, after the cause of the fuse 300 tripping has been removed, the fuse 300 can be reset in a controlled manner (e.g. by qualified service personnel). Alternatively or additionally, the coil $L_3$ 304 can be actuated by a processor of the component in which the fuse 300 is installed (for example by the control unit 101). The resetting can be initiated by use of special commands that are protected e.g. by special codes in order for the action of the fuse 300 not to be able to be manipulated in an unauthorized manner. Alternatively or additionally, mechanical resetting can be made possible by an operating mechanism routed out of the component.

Figure 4A:
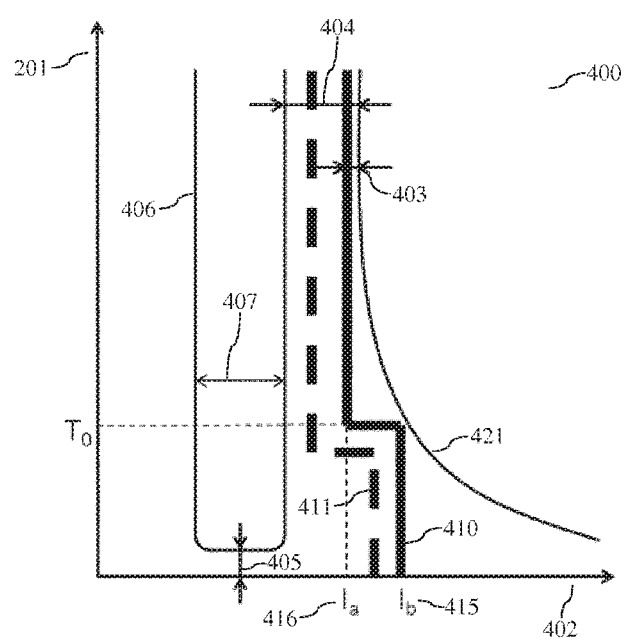
FIG. 4a is a diagram of an exemplary current/time graph for a fuse.

FIG. 4a shows an exemplary current/time graph 400 for a fuse 100, 300. In particular, FIG. 4a shows an operating current 421 for which a system that is to be made safe, which is downstream of the fuse 100, 300, is designed. Typically, such systems have a certain thermal inertia, so that an increased current 421 can be processed for short periods 201 without permanently damaging the system. Furthermore, FIG. 4a shows an exemplary typical (and/or maximum) operating current 411 for the downstream system. This typical operating current 411 is smaller than the current 421 for which the system is designed. In the example shown, the operating current 411 is increased for short periods 201, which may be the case with electric motors on account of a starting current, for example.

The control unit 101 may be set up to produce a time profile for the tripping current threshold value 410. As shown in FIG. 4a, the time profile of the tripping current threshold value 410 may match the time profile of the typical operating current 411, and follow the time profile of the typical operating current 411 with a certain safety margin. In particular, the time profile of the tripping current threshold value 410 may lie between the time profile of the typical operating current 411 and the time profile of the operating current 421 for which the system to be made safe is designed. In the example shown in FIG. 4a, the tripping current threshold value 410 is $I_h$, 415 for periods $T<T_0$ and $I_a$ 416 for periods $T \geq T_0$. The fuse 100, 300 may he configured such that the time profile of the tripping current threshold value 410 has a predefined minimum margin 403 in relation to the operating current 421 for which the system to be made safe is designed.

The time profile of the tripping current threshold value 410 corresponds to a fuse characteristic curve provided by the electronic/magnetic method described in this document. FIG. 4a also shows a fuse characteristic curve 406 that is provided by the fuse 100, 300 in the event of the control unit 101 failing. The fuse characteristic curve 406 is an electromagnetic fuse characteristic curve that is obtained on the basis of the line current 111 (and without the action of a control current 113). The fuse characteristic curve 406 typically has a minimum tripping threshold (at a relatively low current 402) and a maximum tripping threshold (at a relatively high current 402). These tripping thresholds are typically at lower currents than the tripping current threshold values 410. The difference between maximum tripping threshold and minimum tripping threshold is a tolerance range 407 for the purely electromagnetic tripping. The electromagnetic tripping typically has a certain inertia that results in current surges that are shorter than an inertia period 405 not leading to the fuse 100, 300 tripping. The fuse 100, 300 may he configured such that the maximum tripping threshold has a predefined minimum margin 404 in relation to the operating current 421 for which the system to he made safe is designed. The predefined minimum margin 404 can typically be stipulated independently of the minimum margin 403.

Figure 4B:
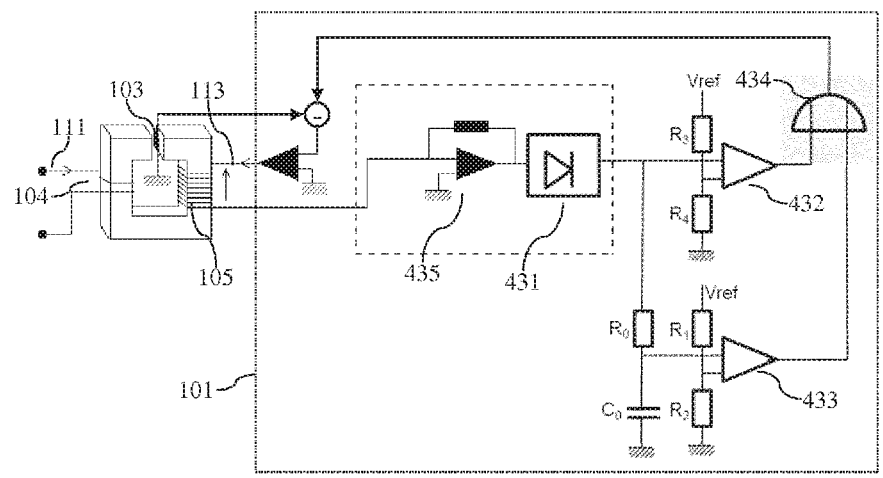

FIG. 4h shows a block diagram of an exemplary electronic (in particular analog) implementation of a control unit 101. In addition, FIG. 4b shows the line coil 104 and the control coil 105, which are coupled to one another by a shared magnetic core. Furthermore, FIG. 4b shows the device 103 for measuring the magnetic field generated by the coils 104, 105. The device 103 for measuring the magnetic field may be a Hall sensor.

The control unit 101 shown in FIG. 4b is set up to produce the profile shown in FIG. 4a for the tripping current threshold value 410. To this end, the control unit can have a rectifier 431 which is set up to rectify the control current 113. The use of a rectifier 431 allows the control unit 101 to be used to make positive and/or negative line currents 111 safe. The control unit 101 additionally includes two comparators 432 and 433 (e.g. operational amplifiers) that can perform a comparison between the control current 113 and the two tripping threshold values $I_a$ 416 and $I_b$ 415 (converted to the control current). Alternatively, as shown in FIG. 4b, the measured control current 113 can be boosted to the appropriate line current 111 by an amplifier 435.

The voltage divider with the resistors $R_3$, $R_4$ can stipulate the tripping threshold value $I_a$ 416, and the comparator 432 can ascertain whether or not the tripping threshold value $I_a$ 416 is exceeded. Similarly, the voltage divider with the resistors $R_1$, $R_2$ can stipulate the tripping threshold value $I_b$ 415, and the comparator 433 can ascertain whether or not the tripping threshold value $I_b$ 415 is exceeded. In this case, the RC element including the resistor $R_0$ and the capacitance $C_0$ delays arise in the (boosted) control current 113 by the time constant $T_0=1/R_0 C_0$, so that a rise in the control current 113 beyond the tripping threshold value $I_b$ 415 is detected by the comparator 433 only after $T_0$ has elapsed.

The OR gate 434 ensures that one of the two instances of the threshold value being exceeded results in reversal of the control current 113 and hence in tripping of the fuse 100, 300. This means that the control unit 101 can be produced by analog circuitry. Alternatively or additionally, it is also possible to use a digital signal processor (e.g. the processor of the component in which the fuse 100, 300 is installed) to produce the control unit 101.

The accuracy of the tripping thresholds $I_a$ 416 and $I_b$ 415 of the electronic/magnetic fuse 100, 300 is influenced by the precision of the magnetic regulation to a particular value (e.g. zero) in the magnetic circuit of the coils 104 and 105, and by the tolerance of the resistors $R_1$, $R_2$, $R_3$, $R_4$. The accuracy of the time response is influenced by the components $R_0$, $C_0$ of the RC element. If necessary, the accuracy can be increased using relatively simple means, e.g. the use of a digital oscillator allows the time response to he specified more precisely. Hence, configuration of the control unit 101 allows the accuracy of the tripping of the fuse 100, 300 to be set.

Figure 5A:
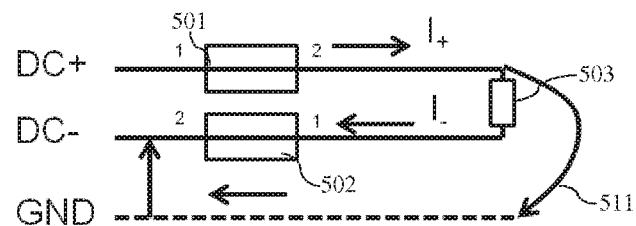
FIG. 5a is an exemplary apparatus for ascertaining a fault current.
Figure 5B:
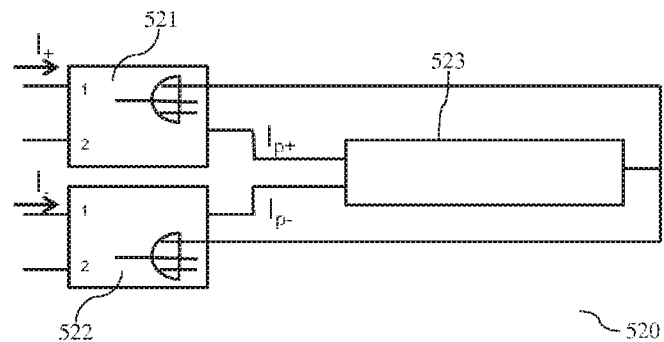
FIG. 5b is an exemplary apparatus for making fault currents safe.

FIGS. 5a and 5b illustrate how two identical fuses 100, 300 on a two-phase line can he combined to form an additional fault current protection without altering the individual protective functions of the individual fuses 100, 300. A line can be made safe with a first fuse 501 upstream of a load 503 and with a second fuse 502 downstream of the load 503. The first fuse 501 carries the first line current $I_+$ and the second fuse 502 carries the second line current $I_-$. The line currents $I_+$ and $I_-$ can be registered in the respective fuses 501, 502, particularly in the respective control units of the fuses. This allows a fault current 511 to be ascertained as a discrepancy between the registered line currents $I_+$ and $I_-$.

FIG. 5b shows a block diagram of an exemplary arrangement 520 for detecting a fault current 511. The two control units 521, 522 of the two fuses 501, 502 supply control currents $I_{p+}$ and $I_{p-}$ and that correspond to the line currents $I_+$ and $I_-$. A comparison unit 523 is set up to compare the control currents $I_{p+}$ and $I_{p-}$ (or signals derived therefrom) and to establish whether an absolute difference $|I_{p+}-I_{p-}|$ is the same as or greater than a predefined fault current threshold value $I_{FaultMax}$. In other words, regardless of the tripping current for the fuses 501, 502, a more sensitive tripping threshold $I_{FaultMax}$ can be chosen for the fault current $I_{Fault}$ 511. To this end, the two signals and $I_{p+}$ and $I_{p-}$ for the fuse currents $I_+$ and $I_-$ can be supplied to a comparing threshold value circuit 523. The result of the comparison can be passed to the respective OR function 434 the two individual fuses 501, 502 (particularly the two control units 521, 522) for tripping purposes. Thus, when a fault current 511 is present, tripping of the individual fuses 501, 502 can be initiated (regardless of the actual level of the line currents $I_+$ and $I_-$).

Figure 6:
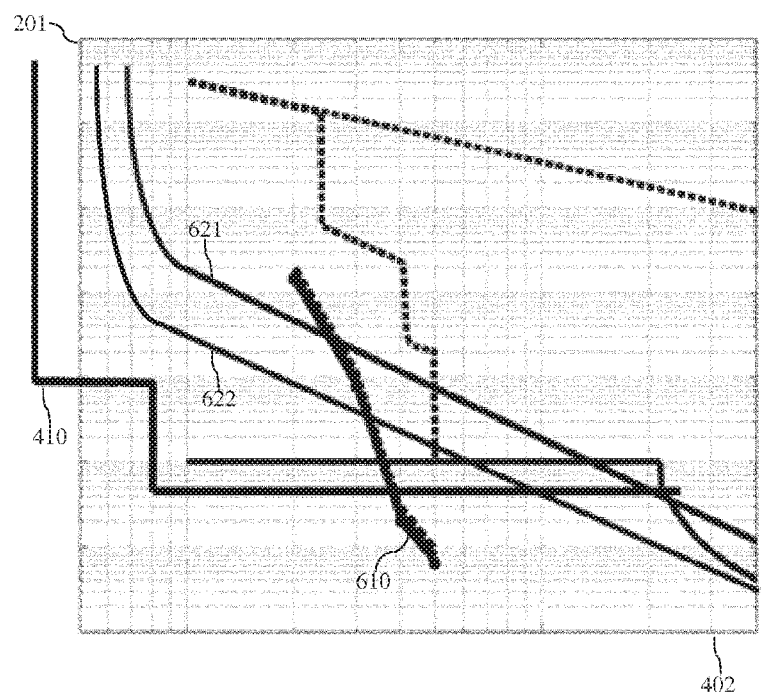
FIG. 6 is an exemplary current/time graph for a fuse that comprises a combination of an electronic/mechanical fuse and a fuse link.

The electronic/magnetic fuse 100, 300 described in this document can be combined the fuse link. The fuse link can ensure that the line 107 is broken for extreme line currents in any event. On the other hand, the electronic/magnetic fuse 100, 300 can make smaller critical line currents safe. The circuit breaker typically requires only a low braking capability. In other words, the fuse link can be used as a safeguard for a malfunction in the electronic/magnetic fuse 100, 300 (e.g. on account of a jammed disconnector switch 104 This is shown in the current/time graph in FIG. 6. FIG. 6 shows exemplary operating currents 622, 621 for which different lines (with a 2.5 mm$^2$ and with a 4 mm$^2$ cross section) are designed. The time profile of the tripping current threshold value 410 of the electronic/magnetic fuse 100, 300 ensures that the respective line is broken before the operating currents 622, 621 are reached. As a further safety level, a fuse link (profile 610) ensures that if the line has not been broken by the electronic/magnetic fuse 100, 300, the line is broken by the fuse link from a particular line current onward.

In summary, this document describes an electronic/magnetic method that avoids the disadvantages of fuse links and/or of electromechanical fuses. The relocation of the tripping properties to a control unit 101 (e.g. to an electronic circuit) furthermore results in numerous possibilities:

Simplified parameterization of the fuse 100 in the production process. If the control unit 101 is an electronic circuit, then it is possible, e.g. by using methods such as trimming resistors or by using checksum protected parameterization by means of SW, to reduce or totally avoid the number of different HW variants of the fuse 100, 300 for different applications.

The fuse currents (i.e. the line currents 111) can be measured by the control unit 101. The measured signals can be made available to a piece of control SW by means of AD (analog-to-digital) conversion. The control SW can be used e.g. to perform plausibilization of the currents or to perform a system diagnosis.

FIGS. 5a and 5b show a combination of two fuses 501, 502 for producing a fault current protection circuit. In this case, further circuit optimization measures can be performed for the control units 521, 522, since the two complete fuses 501, 502 with approximately identical currents and characteristics contain redundancies.

The fuse 100, 300 described in this document provides a DC isolated signal in respect of the level of the line current 111 through the fuse 100, 300. Furthermore, the possibility of additional fuse tripping is provided.

In the absence of a supply voltage for the fuse electronics 101, it is possible, as shown in FIG. 4a, for a tripping threshold 406 to be stipulated below the typical operating current 411 of the downstream functional unit. This can result in disconnection even though the maximum current of the functional unit has not been reached. This can make sense, since the fault in the power supply 110 for the fuse 100 already entails a fault in the onboard power supply system. The tripping caused by the tripping threshold 206 does not occur during correct operation, but prevents the fuse 100, 300 from tripping too late when there is a fault in the fuse 100, 300.

The electronic/magnetic fuse 100, 300 described in this document meets all the necessary requirements for use in a vehicle. In particular, the fuse described allows independence of use temperature, and robustness in the face of tremors and vibrations. The fuse also has low tolerances in respect of the tripping current, which are furthermore able to be adjusted in the production process too. This allows an optimum design for the systems that are to be made safe, which can lead e.g. to smaller line cross sections, low weight, etc. The fuses described therefore allow the costs d the weight of vehicles to be reduced.

Measures have furthermore been described that allow resettability of the fuse to be achieved by way of a flexibly definable mechanism. There is therefore no need to replace components. Furthermore, the function of the fuses described in this document is ensured even in the absence of a power supply.

Furthermore, there is the possibility of parameterizing the tripping characteristics of the fuse during the production process. In this case, the parameterization is independent of mechanical constraints. There is therefore increased flexibility for the generation of tripping characteristic curves.

As already explained above, the electronics of the fuse are completely DC isolated from the fuse path 107. This facilitates implementation, since fewer safety requirements need to be met. Furthermore, the method described in this document allows DC isolated voltage tapping for the purpose of measuring the line or fuse current. This can be used e.g. to perform software plausibilizations for the operating current. Furthermore, the method described allows a DC isolated opportunity for intervention for disconnection purposes on the basis of further tripping signals, e.g. when serious software errors occur and are identified, or when a crash event s identified.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuse for interrupting a line, the fuse comprising:
a line coil that is configured to carry a line current on the line and to thereby generate a magnetic field;
a control coil that is magnetically but not electrically coupled to the line coil;
a circuit breaker, which is magnetically coupled to the control coil and the line coil and that is configured to be opened by the magnetic field to interrupt the line based on a field strength of the magnetic field; and
a control unit that controls a control current through the control coil in order to alter the field strength of the magnetic field, so as to:
  (a) prevent the circuit breaker from opening to interrupt the line by compensating for changes in the magnetic field of the line coil caused by the line current, and
  (b) cause the circuit breaker to open to interrupt the line by ceasing to compensate for changes in the magnetic field of the line coil caused by the line current,
wherein the circuit breaker is not controlled via an electrical signal received by the circuit breaker from the control unit.

2. The fuse according to claim 1, wherein:
the fuse comprises a device for measuring the field strength of the magnetic field; and
the control unit is set up to determine the control current based on the measured field strength of the magnetic field.

3. The fuse according to claim 2, wherein the control unit is further set up to:
compare a signal derived from the control current with a tripping current threshold value;
determine the control current such that the magnetic field generated by the line coil is attenuated if the derived signal is smaller than the tripping current threshold value; and/or
determine the control current such that the magnetic field generated by the line coil is boosted if the derived signal is larger than the tripping current threshold value.

4. The fuse according to claim 3, wherein the control unit is further set up to:
establish whether the signal derived from the control current is at or above the tripping current threshold value for at least one predefined period; and
determine the control current such that the magnetic field generated by the line coil is boosted if the derived signal is at or above the tripping current threshold value for at least the predefined period.

5. The fuse according to claim 4, wherein the control unit is further set up to determine the control current such that the field strength is lower than a predefined field strength threshold value if the derived signal is smaller than the tripping current threshold value.

6. The fuse according to claim 3, wherein the control unit is further set up to determine the control current such that the field strength is lower than a predefined field strength threshold value if the derived signal is smaller than the tripping current threshold value.

7. The fuse according to claim 1, wherein the line coil comprises a smaller number of turns than the control coil.

8. The fuse according to claim 1, wherein the fuse comprises a resetting coil that is set up to close the circuit breaker, by building up an additional magnetic field, in order to suspend interruption of the line.

9. The fuse according to claim 1, wherein:
the fuse is designed such that the magnetic field generated by the line current causes interruption of the line by the circuit breaker if the line current reaches or exceeds a default threshold value; and
the default threshold value is lower than a predefined feasible operating current for a component that is supplied with electric current via the line.

10. The fuse according to claim 9, wherein:
the component has a typical operating current that is smaller than the predefined feasible operating current of the component;
the default threshold value is lower than the typical operating current; and
the control unit is set up to determine the control current such that the circuit breaker interrupts the line at a line current that is higher than the typical operating current and is smaller than the predefined feasible operating current.

11. An apparatus for identifying a fault current through a load, the apparatus comprising:
- a first fuse on a line that leads to the load, wherein the first fuse is configured to determine a first control current;
- a second fuse on a line that leads away from the load, wherein the second fuse is configured to determine a second control current; and
- a comparison unit that is configured to compare the first and second control currents and to take the comparison as a basis for identifying a fault current,
- wherein each of the first and second fuses comprises:
  - a line coil that is configured to carry a line current on the line and to thereby generate a magnetic field;
  - a control coil that is magnetically but not electrically coupled the line coil;
  - a circuit breaker, which is magnetically coupled to the control coil and the line coil and that is configured to be opened by the magnetic field to interrupt the line based on a field strength of the magnetic field; and
  - a control unit that is configured to control the control current through the control coil in order to alter the field strength of the magnetic field, so as to:
    - (a) prevent the circuit breaker from opening to interrupt the line by compensating for changes in the magnetic field of the line coil caused by the line current, and
    - (b) cause the circuit breaker to open to interrupt the line by ceasing to compensate for changes in the magnetic field of the line coil caused by the line current,
- wherein the circuit breaker is not controlled via an electrical signal received by the circuit breaker from the control unit.

* * * * *